(12) United States Patent
Kariya et al.

(10) Patent No.: US 8,195,354 B2
(45) Date of Patent: Jun. 5, 2012

(54) DIAGNOSTIC DEVICE FOR INTERNAL COMBUSTION ENGINE

(75) Inventors: Yasuhiro Kariya, Oobu (JP); Tsukasa Kuboshima, Okazaki (JP)

(73) Assignee: Denso Corporation, Kariya (JP)

( * ) Notice: Subject to any disclaimer, the term of this patent is extended or adjusted under 35 U.S.C. 154(b) by 1112 days.

(21) Appl. No.: 12/019,099

(22) Filed: Jan. 24, 2008

(65) Prior Publication Data

US 2008/0215205 A1    Sep. 4, 2008

(30) Foreign Application Priority Data

Jan. 24, 2007    (JP) ................. 2007-013356

(51) Int. Cl.
*G01M 17/00*    (2006.01)
(52) U.S. Cl. ........... 701/29.1; 701/29.2; 701/29.6; 701/31.7; 701/31.8; 701/31.9; 60/277; 60/295; 60/297
(58) Field of Classification Search .................. None
See application file for complete search history.

(56) References Cited

U.S. PATENT DOCUMENTS

| | | | |
|---|---|---|---|
| 6,687,601 B2 * | 2/2004 | Bale et al. ............. | 701/108 |
| 6,725,652 B2 * | 4/2004 | Sakaguchi ............. | 60/297 |
| 7,028,467 B2 * | 4/2006 | Kuboshima et al. ...... | 60/297 |
| 7,051,689 B2 * | 5/2006 | Tamura et al. .......... | 123/90.15 |
| 7,174,706 B2 * | 2/2007 | Kuboshima et al. ...... | 60/295 |
| 7,263,427 B2 * | 8/2007 | Hasegawa et al. ........ | 701/107 |
| 7,478,553 B2 * | 1/2009 | Higuchi ................ | 73/114.73 |
| 2004/0159099 A1 * | 8/2004 | Kuboshima et al. ...... | 60/297 |
| 2005/0022519 A1 * | 2/2005 | Shirakawa ............. | 60/297 |
| 2005/0178272 A1 * | 8/2005 | Kariya et al. .......... | 96/421 |
| 2005/0188681 A1 * | 9/2005 | Emi et al. ............. | 60/277 |
| 2005/0217250 A1 * | 10/2005 | Kuboshima et al. ...... | 60/287 |
| 2005/0274104 A1 * | 12/2005 | Bromberg et al. ....... | 60/275 |
| 2006/0196167 A1 * | 9/2006 | Odajima et al. ........ | 60/277 |
| 2006/0254265 A1 * | 11/2006 | Odajima et al. ........ | 60/297 |
| 2007/0056271 A1 * | 3/2007 | Berryhill et al. ....... | 60/297 |

(Continued)

FOREIGN PATENT DOCUMENTS

DE    10 2004 017 521    11/2004

(Continued)

OTHER PUBLICATIONS

Japanese Office Action dated Jan. 5, 2011, issued in corresponding Japanese Application No. 2007-013356 with English Translation.

(Continued)

*Primary Examiner* — Khoi Tran
*Assistant Examiner* — Jonathan L Sample
(74) *Attorney, Agent, or Firm* — Nixon & Vanderhye PC

(57) ABSTRACT

A diagnostic device of an internal combustion engine diagnoses a condition of a differential pressure sensor. The sensor in a normal condition detects a differential pressure of an exhaust gas between upstream and downstream sides of a diesel particulate filter disposed in an exhaust system of the engine. The sensor in a fault condition detects no differential pressure of the exhaust gas. The device has a block obtaining a first signal from the sensor when the engine is operated in a low flow rate region of the exhaust gas and obtaining a second signal from the sensor when the engine is operated in a high flow rate region of the exhaust gas. A diagnostic block of the device judges from a difference between levels of the first and second signals whether the sensor is in the normal or fault condition.

16 Claims, 9 Drawing Sheets

U.S. PATENT DOCUMENTS

| | | | |
|---|---|---|---|
| 2007/0068147 A1* | 3/2007 | Sun et al. | 60/297 |
| 2007/0068157 A1* | 3/2007 | Kurtz | 60/605.2 |
| 2007/0101702 A1* | 5/2007 | Saito | 60/286 |
| 2008/0066456 A1* | 3/2008 | Schmieg et al. | 60/286 |
| 2008/0264050 A1* | 10/2008 | Wakamatsu | 60/311 |

FOREIGN PATENT DOCUMENTS

| | | |
|---|---|---|
| DE | 101 12 138 | 9/2009 |
| JP | 06-330732 | 11/1994 |
| JP | 2003-314248 | 11/2003 |
| JP | 2005-307880 | 11/2005 |

OTHER PUBLICATIONS

German Office Action dated Jul. 28 2011, issued in corresponding German Application No. 10 2008 000 138.4-13 with English Translation.

* cited by examiner

| DISCONNECTION | LEVEL OF DETECTION SIGNAL |
|---|---|
| PV | HI CLAMP VALUE |
| PM | LO CLAMP VALUE |
| PP | HI CLAMP VALUE |
| PG | LO CLAMP VALUE |

DIAGNOSTIC DEVICE FOR INTERNAL COMBUSTION ENGINE

CROSS-REFERENCE TO RELATED APPLICATION

This application is based upon and claims the benefit of priority of the prior Japanese Patent Application 2007-013356 filed on Jan. 24, 2007 so that the contents of which are incorporated herein by reference.

BACKGROUND OF THE INVENTION

1. Field of the Invention

The present invention relates generally to a diagnostic device that diagnoses a failure or malfunction of a differential pressure detecting unit which detects a differential pressure of an exhaust gas at upstream and downstream sides of an exhaust emission control device disposed in an exhaust system of an internal combustion engine.

2. Description of Related Art

As an exhaust emission control device of an internal combustion engine, a diesel particulate filter (called DPF) is, for example, disposed in an exhaust system of a diesel engine to reduce hazardous materials included in an exhaust gas of the engine. In this system, a differential pressure detecting sensor is disposed so as to detect a differential pressure of the exhaust gas between upstream and downstream sides of the DPF, and it is judged or diagnosed based on a detection result of the sensor whether or not a failure has occurred in the sensor. For example, Published Japanese Patent First Publication No. 2005-307880 has disclosed a diagnostic device. In this device, because particulate matters contained in the exhaust gas are deposited in a DPF, a quantity of the deposited particulate matters is estimated based on operation conditions of the engine, and a normal range of differential pressure detected by the sensor is determined based on the estimated quantity. Then, it is judged whether or not a detection result of the sensor is placed within the normal range. When the detection result is placed out of the normal range, the diagnostic device judges that a failure has occurred in the sensor.

However, there are many types of failure that can occur in the sensor. When a specific type of failure has occurred in the sensor, a detection result of the sensor having no relation to a differential pressure of the exhaust gas is sometimes placed or fixed within the normal range. In this case, even when the sensor is actually placed in a fault condition, the diagnostic device sometimes misjudges that the sensor is in a normal condition.

SUMMARY OF THE INVENTION

An object of the present invention is to provide, with due consideration to the drawbacks of the conventional diagnostic device, a diagnostic device that reliably judges or diagnoses a condition of a detecting unit which detects a differential pressure of an exhaust gas between upstream and downstream sides of an exhaust emission control device.

According to an aspect of this invention, the object is achieved by the provision of a diagnostic device for diagnosing a condition of a detecting unit being comprised of an operation condition judging unit, a detection result obtaining unit, and a diagnostic unit. When the detecting unit is in a normal condition, the detecting unit detects a differential pressure of an exhaust gas between upstream and downstream sides of an exhaust emission control device disposed in an exhaust system of an internal combustion engine. When the detecting unit is in a fault condition, the detecting unit detects no differential pressure of the exhaust gas. The judging unit judges whether the engine is operated in a low flow rate region or in a high flow rate region. A flow rate of the exhaust gas passing through the exhaust emission control device in the high flow rate region is higher than that in the low flow rate region. The obtaining unit obtains a first detection result of the detecting unit when the judging unit judges the engine to be operated in the low flow rate region and obtains a second detection result of the detecting unit when the judging unit judges the engine to be operated in the high flow rate region. The diagnostic unit judges from a difference between the first and second detection results whether the detecting unit is in the normal condition or in the fault condition.

With this configuration of the diagnostic device, a differential pressure of the exhaust gas is increased with a flow rate of the exhaust gas. Therefore, a differential pressure of the exhaust gas in the high flow rate region is higher than that in the low flow rate region. When the detecting unit is in a normal condition, the second detection result of the detecting unit indicates a differential pressure higher than that indicated by the first detection result of the detecting unit. In contrast, when the detecting unit is in a fault condition due to the occurrence of a failure in the detecting unit, the second detection result is substantially the same as the first detection result. Therefore, the diagnostic unit can judge from a difference between the first and second detection results whether the detecting unit is in a normal condition or in a fault condition.

Accordingly, the diagnostic device can reliably judge or diagnose a condition of the detecting unit.

DETAILED DESCRIPTION OF THE PREFERRED EMBODIMENT

A diagnostic device for an on-vehicle diesel engine representing a diagnostic device for an internal combustion engine will now be described according to an embodiment of the present invention with reference to the accompanying drawings.

Figure 1:
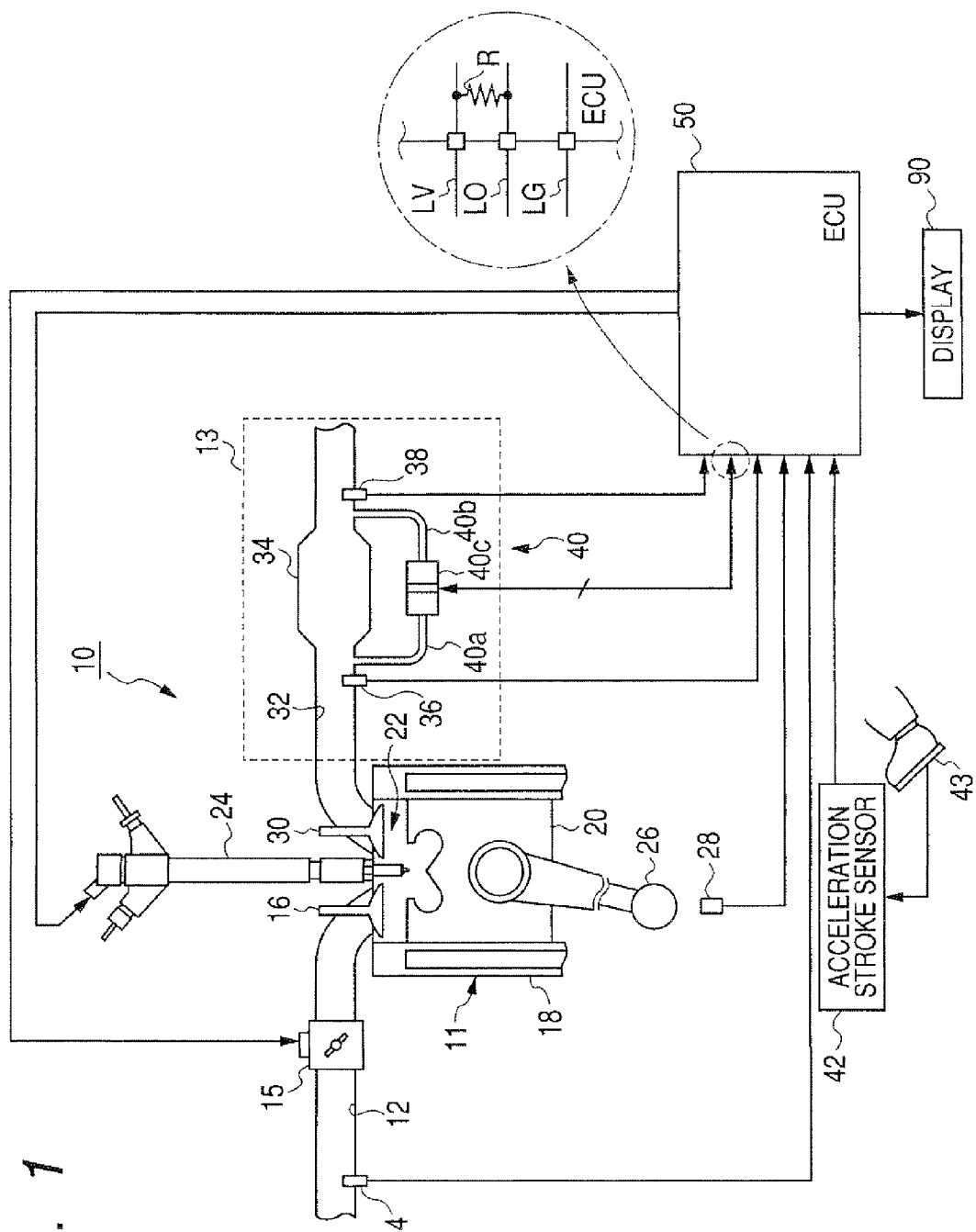
FIG. 1 is a structural view of a diesel engine system with an electronic control unit representing a diagnostic device according to an embodiment of the present invention.

FIG. 1 is a structural view of a diesel engine system with an electronic control unit representing a diagnostic device according to an embodiment. This diesel engine system is, for example, mounted on a vehicle and produces a torque required to drive the vehicle.

As shown in FIG. 1, a diesel engine system has a diesel engine 10 composed of a plurality of cylinders (only one cylinder is shown for convenience) 11, an intake pipe 12 through which an air is supplied to the engine 10, a fuel injection valve 24 injecting fuel into the engine 10, and an exhaust system 13 through which an exhaust gas of the engine 10 is output to the atmosphere.

Each cylinder 11 has a cylinder block 18, an intake valve 16, an exhaust valve 30, and a piston 20 connected with a crankshaft 26 common to the cylinders 11. A combustion chamber 22 surrounded by the block 18 and the piston 20 is formed. The intake pipe 12 is connected with the cylinder 11 through the intake valve 16 so as to communicate with the chamber 22 through the opened intake valve 16. The fuel injection valve 24 is attached to the cylinder 11 so as to project into the chamber 22 and injects fuel into the engine 10.

The exhaust system 13 has an exhaust pipe 32 communicating with the chamber 22 through the opened exhaust valve 30, a diesel particulate filter (herein after, called DPF) 34 representing an exhaust emission control device, and a differential pressure sensor 40. The DPF 34 has an oxidation catalyst and purifies an exhaust gas outputted from the chamber 22 and passing through the pipe 32. The sensor 40 normally detects a differential pressure of the exhaust gas between upstream and downstream sides of the DPF 34 when the sensor is in a normal condition.

The engine system further has an acceleration stroke sensor 42, an air flow meter 14 attached to the pipe 12, a throttle valve 15 disposed in the pipe 12, a crank angle sensor 28, a first exhaust gas temperature sensor 36 disposed on an upstream side of the DPF 34, a second exhaust gas temperature sensor 38 disposed on a downstream side of the DPF 34, an electronic control unit (ECU) 50 controlling the engine 10 according to data detected in the sensors and meter, and a display 90.

The meter 14 detects a mass flow rate of the air supplied to the engine 10. The throttle valve 15 adjusts a quantity GA of air taken in the engine 10. The sensor 28 detects a rotational angle of the crank shaft 26. The sensor 42 detects a stroke position of an accelerator pedal 43. The sensor 36 detects a temperature Teu of the exhaust gas at the upstream side of the DPF 34. The sensor 38 detects a temperature Ted of the exhaust gas at the downstream side of the DPF 34.

The ECU 50 calculates the quantity GA of the air taken in the engine 10 from data of the meter 14, calculates an engine speed NE from data of the sensor 28, and calculates a quantity Q of fuel injected into the engine 10 from data of the sensor 42. The display 90 displays information indicating operation conditions of the engine 10.

The sensor 40 has an upstream pipe 40a communicating with an upstream portion of the DPF 34, a downstream pipe 40b communicating with a downstream portion of the DPF 34, and a sensing member 40c detecting a difference between pressures of the exhaust gas in the pipes 40a and 40b. Therefore, when the sensing member 40c is in a normal condition, the sensing member 40c produces a detection signal (or detection result) of which a level is substantially equal to a differential pressure of the exhaust gas between the upstream and downstream sides of the DPF 34. In contrast, when the sensor 40 is in a fault condition, the sensor 40 produces a detection signal (or detection result) the level of which has no relation to the differential pressure.

When fuel is injected into the chamber 22 through the valve 24 under control of the ECU 50 while air passing through the pipe 12 is supplied into the chamber 22 through the valve 15, the fuel is self-fired in response to the compression of air-fuel mixture in the chamber 22, and combustion energy is generated. This energy is transmitted to the shaft 26 through the piston 20 as rotational kinetic energy. Further, an exhaust gas is produced in the chamber 22 due to combustion of the air-fuel mixture. The exhaust gas passes through the pipe 32 and is purified in the DPF 34. The gas is finally outputted to the atmosphere.

The ECU 50 is made of a microcomputer. The ECU 50 receives information indicating operation conditions of the engine 10 from the sensors 23, 36, 33 and 40, the meter 14 and receives information indicating a stroke position of an accelerator pedal from the sensor 42. The ECU 50 controls the valves 24 and 15 to adjust a quantity of the fuel and a quantity of the air supplied into the engine 10 according to the received information, so that the ECU 50 controls an output of the engine 10. For example, the ECU 50 calculates and determines a quantity of the fuel to be injected from the valve 24 from data detected in the sensors 28, 36, 38 and 42, the meter 14 and the detection result of the sensor 40 to generate a torque required by a driver of the vehicle.

The sensing member 40c of the sensor 40 is connected with the ECU 50 through each of a power source line LV, an output line LO and a grounding line LG. The lines LV and LO are connected with each other through a resistor R in the ECU 50. An electric power is supplied from the ECU 50 to the member 40c through the line LV. A detection signal of the member 40c is output to the ECU 50 through the line LO. The line LG is connected with a ground terminal (not shown) of the ECU 50.

Figure 2:
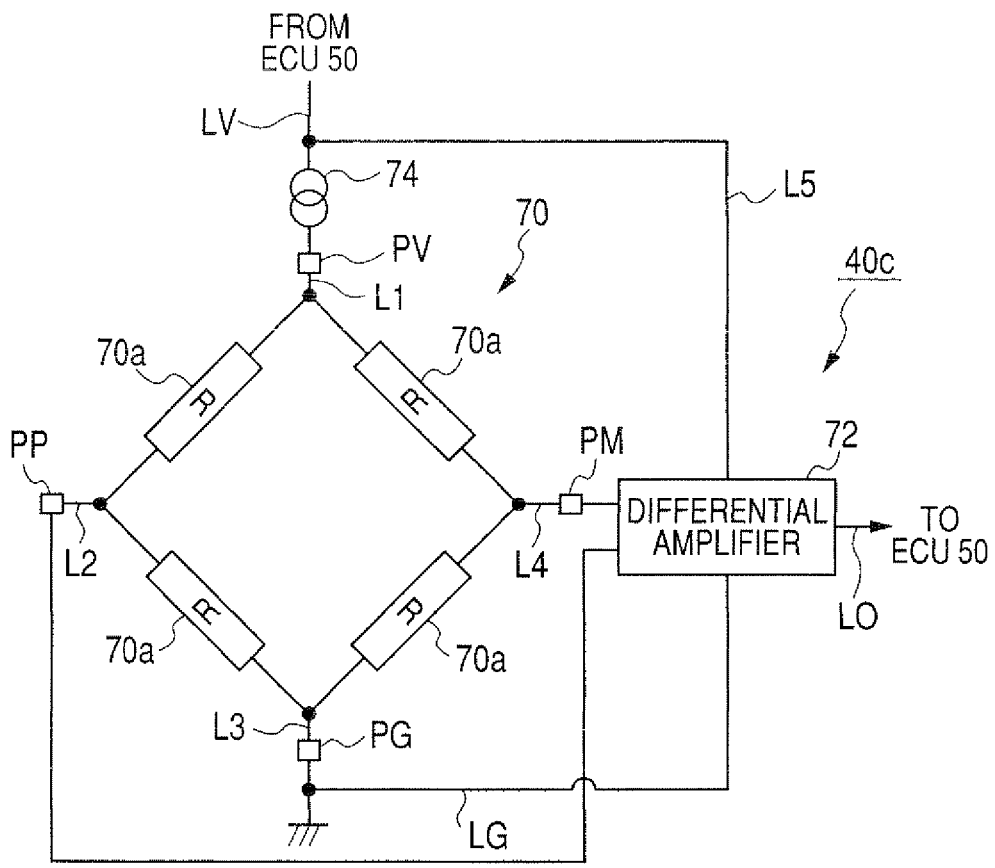
FIG. 2 is a circuit view of a sensing member of a differential pressure detecting sensor disposed in the diesel engine system shown in FIG. 1.

FIG. 2 is a circuit view of the sensing member 40c. As shown in FIG. 2, the sensing member 40c has a sensing portion 70, a differential amplifier 72 and an equivalent circuit with constant current source 74. The portion 70 has four strain gauges 70a forming a Wheatstone bridge circuit. Each strain gauge 70a is connected with two other adjacent strain gauges 70a at connecting points. One of the first two connecting points disposed on a diagonal line of the bridge circuit is connected with an end of the circuit 74 through a power supply pad PV. The other end of the circuit 74 is connected with the line LV. The other first connecting point is connected with the line LG through a grounding pad PG. One of the second two connecting points disposed on another diagonal line of the bridge circuit is connected with the amplifier 72 through a plus pad PP. The other second connecting point is connected with the amplifier 72 through a minus pad PM. The amplifier 72 is connected with the lines LV, LO and LG.

The sensing portion 70 produces a strain signal in response to a differential pressure of the exhaust gas between the pipes 40a and 40b. A level of the strain signal corresponding to the differential pressure is indicated by a differential voltage between the two second connecting points. The amplifier 72 amplifies the level of the strain signal to produce a detection signal set at the amplified level and outputs the signal to the ECU 50 through the line LO. The ECU 50 converts the amplified level of the detection signal into the differential pressure.

Figure 3:
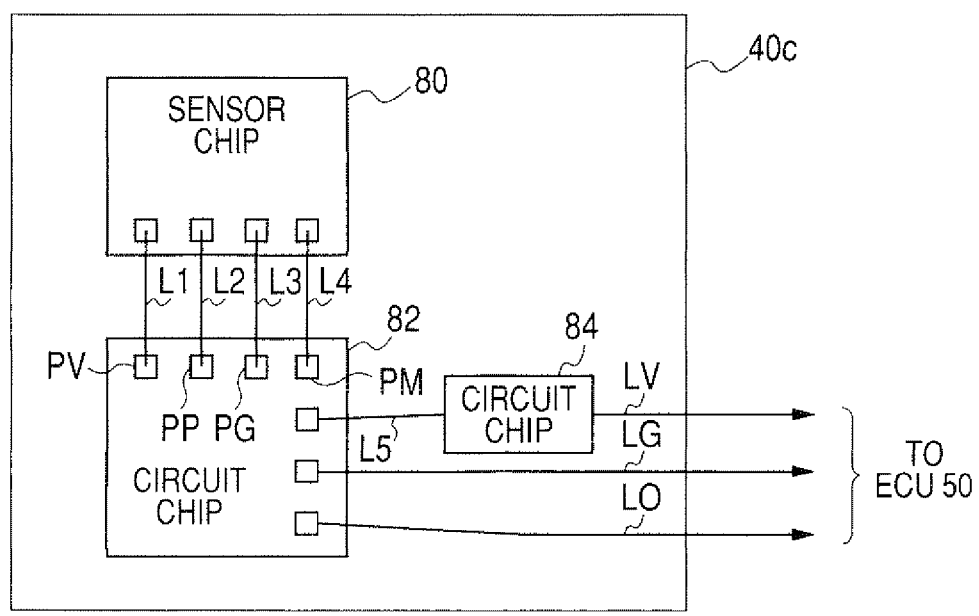
FIG. 3 is an exterior view of the sensing member.

FIG. 3 is an exterior view of the sensing member 40c according to this embodiment. As shown in FIG. 3, the sensing member 40c has a sensor chip 80 with the sensing portion 70 shown in FIG. 2, a circuit chip 82 with the amplifier 72 shown in FIG. 2, and another circuit chip 84 with the circuit 74 shown in FIG. 2. The chips 80 and 82 are connected with each other through each of a first wire L1, a second wire L2, a third wire L3 and a fourth wire L4. The first wire L1 connects a first pad of the chip 80 and the pad PV. The second wire L2 connects a second pad of the chip 80 and the pad PP. The third wire L3 connects a third pad of the chip 30 and the pad PG. The fourth wire L4 connects a fourth pad of the chip 80 and the pad PM. A fifth wire L5 connects a first pad of the chip 82 with the chip 84. The line LG extends from a second pad of the chip 82 to the ECU 50, and the line LO extends from a third pad of the chip 82 to the ECU 50.

Figures 4, 5:
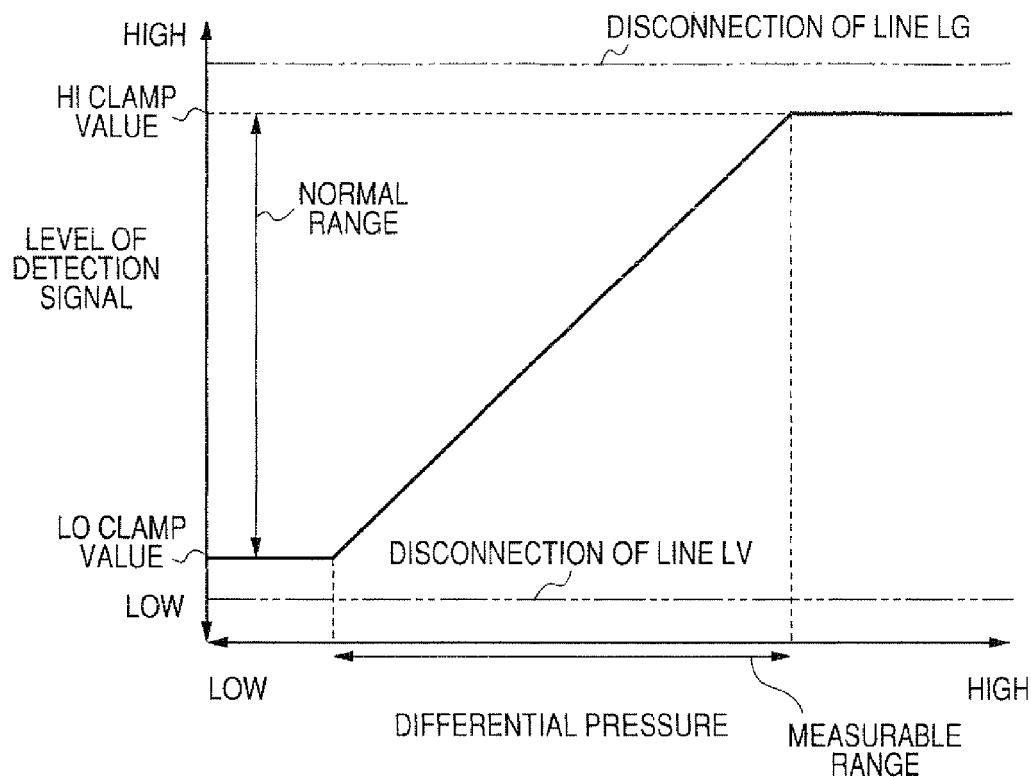
FIG. 4 shows a relation between a differential pressure of an exhaust gas and a level of a detection signal output from a differential pressure detecting sensor shown in FIG. 1.
FIG. 5 shows a level of the signal output from the sensor in case of the occurrence of a wire disconnection.

FIG. 4 shows a relation between the differential pressure of the exhaust gas and a level of a detection signal output from the sensor 40. As shown in FIG. 4, when a differential pressure of the exhaust gas between the upstream and downstream sides of the DPF 34 is placed within a measurable range, a level of the detection signal output from the sensor 40 is changed with or increased with the differential pressure in a normal range (see solid line). When the differential pressure is lower than a lower limit of the measurable range, a level of the signal is fixed to an LO clamp value (see solid line). The LO clamp value is a lower limit of the normal range. In contrast, when the differential pressure is higher than an upper limit of the measurable range, a level of the signal is fixed to an HI clamp value (see solid line). The HI clamp value is a higher limit of the normal range.

When the grounding line LG is disconnected from the sensor 40, a level of the signal is fixed at a high value higher than the HI clamp value (see two-dots-dash-line). When the power source line LV is disconnected from the sensor 40, a level of the signal is fixed at a low value lower than the LO clamp value (see dot-dash-line). That is, when a type of failure such as a disconnection of the grounding line LG or a disconnection of the power source line LV has occurred in the sensor 40, and a level of the signal is set out of the normal range. Therefore, the ECU 50 and a conventional diagnostic device can judge or diagnose that the sensor 40 is put in a fault condition by the disconnection of the line LG or the disconnection of the line LV.

However, there can be other causes for failure such as a disconnection (called PG disconnection) of a conducting line connecting the sensing portion 70 and the grounding line LG through the third wire L3 and the pad PG, a disconnection (called PV disconnection) of a conducting line connecting the sensing portion 70 and the circuit 74 through the first wire L1 and the pad PV, a disconnection (called PP disconnection) of a conducting line connecting the sensing portion 70 and the amplifier 72 through the second wire L2 and the pad PP, and a disconnection (called PM disconnection) of a conducting line connecting the sensing portion 70 and the amplifier 72 through the fourth and fifth wires L4 and L5 and the pad PM. When at least one of these failures has occurred in the sensor 40, a level of the signal output from the sensor 40 is sometimes fixed at a value between the LO clamp value and the HI clamp value.

FIG. 5 shows a level of the signal output from the sensor 40 in case of the occurrence of a wire disconnection such as PV, PM, PP or PG disconnection. As shown in FIG. 5, when the PV disconnection or the PP disconnection has occurred in the sensor 40, a level of the signal output from the sensor 40 is set at the HI clamp value. When the PM disconnection or the PG disconnection has occurred in the sensor 40, a level of the signal is set at the LO clamp value. In these failures, a level of the signal is set within the normal range. Therefore, even when a failure such as the PV, PM, PP or PG disconnection has occurred in the sensor 40, a conventional diagnostic device cannot judge or diagnose that the sensor 40 is put in a fault condition.

Figure 6:
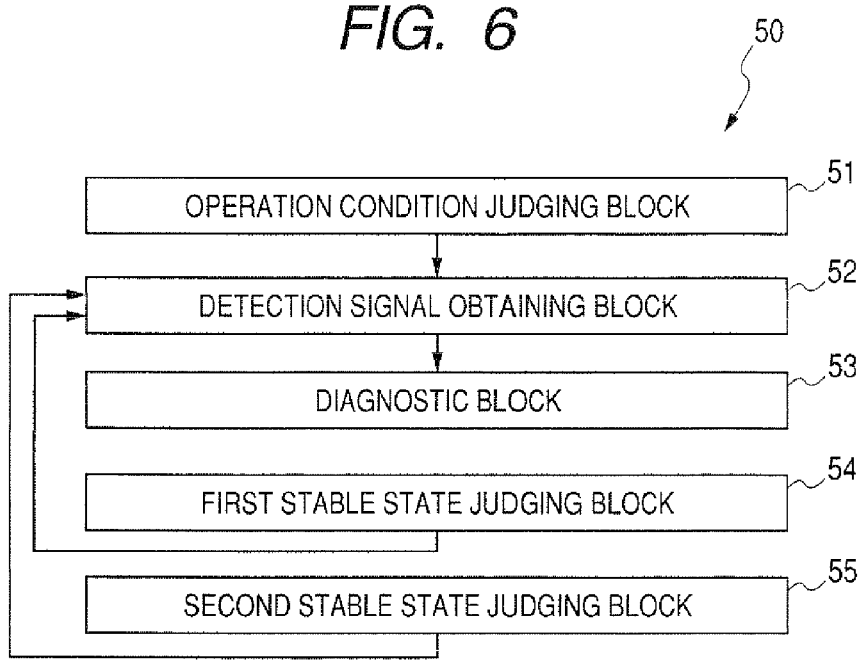
FIG. 6 is a block diagram of the electronic control unit shown in FIG. 1 according to the embodiment.

To solve this problem, as shown in FIG. 6, the ECU 50 according to this embodiment has an operation condition judging block 51, a detection signal obtaining block 52 and a diagnostic block 53. The judging block 51 judges whether the engine 10 is operated in a low flow rate region or a high flow rate region. The flow rate of the exhaust gas passing through the DPF 34 in the high flow rate region is higher than that in the low flow rate region. The obtaining block 52 obtains a first detection signal from the sensor 40 when the block 51 judges the engine 10 to be operated in the low flow rate region and obtains a second detection signal from the sensor 40 when the block 51 judges the engine 10 to be operated in the high flow rate region. The diagnostic block 53 judges or diagnoses from a difference between the first and second detection levels whether or not the sensor 40 is in a normal condition or in a fault condition.

Further, as shown in FIG. 6, the ECU 50 has a first stable state judging block 54 and a second stable state judging block 55. The judging block 54 judges whether or not the engine 10 operated in the low flow rate region is in a stable state. The judging block 55 judges whether or not the engine 10 operated in the high flow rate region is in a stable state. The obtaining block 52 obtains the first detection result when the judging block 54 judges that the engine 10 operated in the low flow rate region is in the stable state, and obtains the second detection result when the judging block 55 judges that the engine 10 operated in the high flow rate region is in the stable state.

Figure 7:
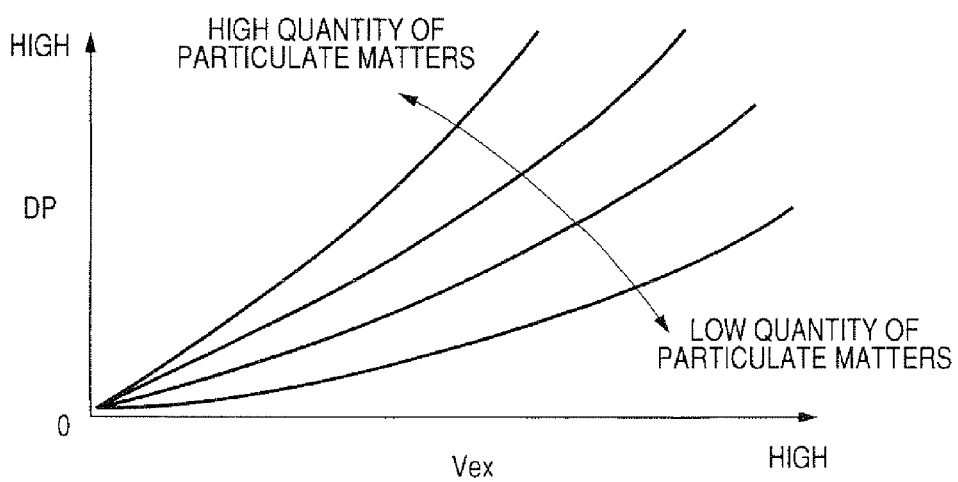
FIG. 7 shows a relation between a volume flow rate of an exhaust gas and a differential pressure of the exhaust gas.

The regions may be differentiated from each other on the basis of a volume flow rate of the exhaust gas. The reason is described with reference to FIG. 7. FIG. 7 shows a relation between a volume flow rate Vex of the exhaust gas and a differential pressure DP of the exhaust gas.

As shown in FIG. 7, a differential pressure DP of the exhaust gas between the upstream and downstream sides of the DPF 34 is increased with a volume flow rate Vex of the exhaust gas passing through the DPF 34. Therefore, when the sensor 40 is in a normal condition, a first detection signal of the sensor 40 indicating a low differential pressure of the exhaust gas at a low volume flow rate distinctly differs from a second detection signal of the sensor 40 indicating a high differential pressure of the exhaust gas at a high volume flow rate. In contrast, when a failure has occurred in the sensor 40, a level of the first detection signal corresponding to the low volume flow rate substantially becomes equal to a level of the second detection signal corresponding to the high volume flow rate. Therefore, the block 53 can judge or diagnose from a difference between the first and second detection signals that the sensor 40 is put in a fault condition.

In this embodiment, the block 51 sets the low flow rate region to be equal to or lower than a low volume flow rate threshold value (first threshold value) VEXL, and sets the high flow rate region to be equal to or higher than a high volume flow rate threshold value (second threshold value) VEXH. The value VEXH is higher than the value VEXL by a predetermined gap.

Figure 8:
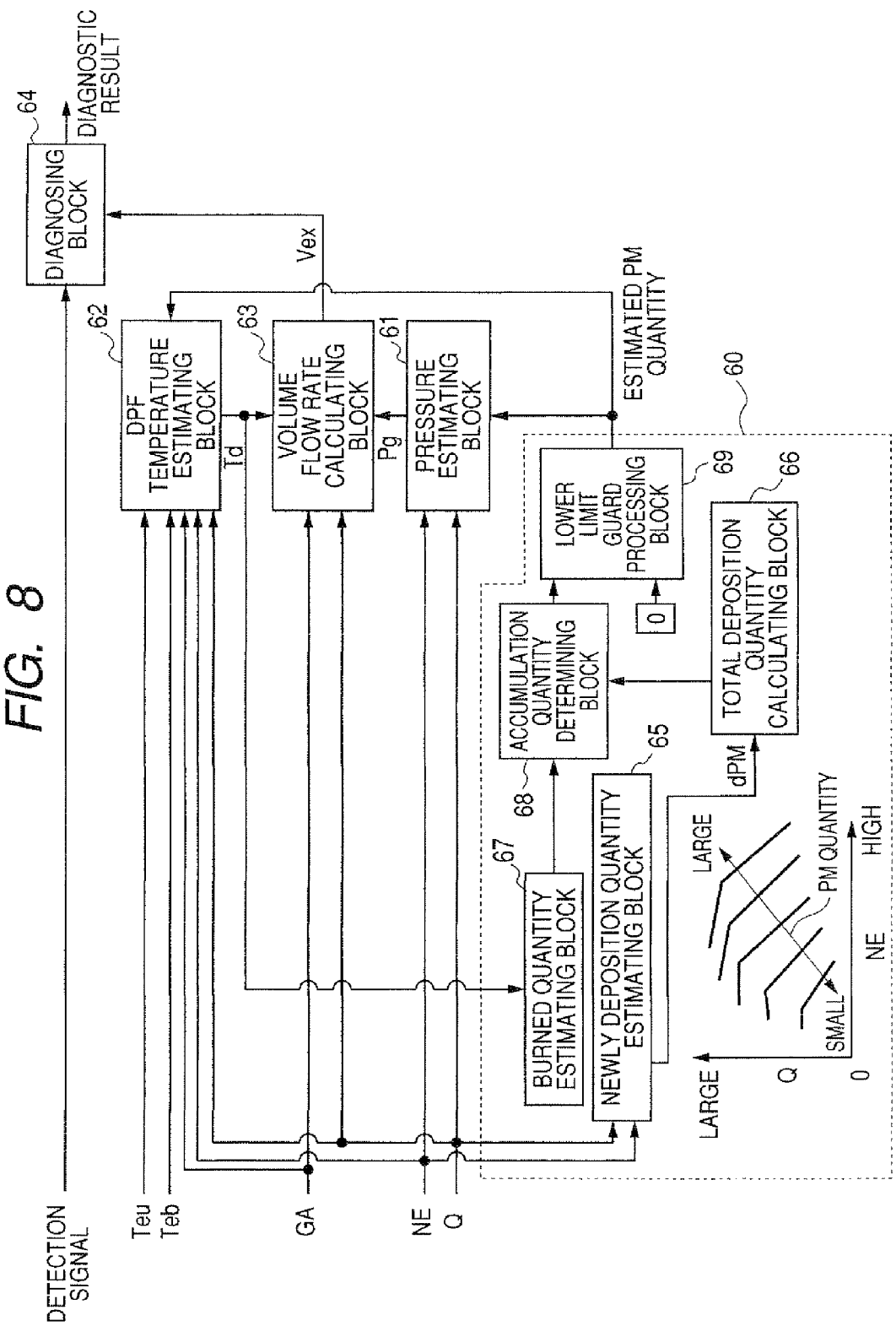
FIG. 8 is another block diagram of an ECU shown in FIG. 1 according to this embodiment.

A structure of the ECU 50 is described with reference to FIG. 8, as an example. FIG. 8 is a block diagram of the ECU 50 according to this embodiment. In this embodiment, the ECU 50 calculates a volume flow rate of an exhaust gas from temperature and pressure of the exhaust gas according to the equation of state of ideal gas. The temperature and pressure of the exhaust gas depend on a quantity of the particulate matters (PM) accumulated in the DPF 34. Therefore, the ECU 50 calculates the quantity of the particulate matters.

As shown in FIG. 3, the ECU 50 has a particulate matter quantity estimating block 60 for estimating a quantity of the particulate matters accumulated in the DPF 34, a pressure estimating block 61 for estimating a pressure Pg of an exhaust gas passing through the DPF 34, a DPF temperature estimating block 62 for estimating a temperature Td of the DPF 34, a volume flow rate calculating block 63 for calculating a volume flow rate Vex of the exhaust gas, and a diagnosing block 64 for judging or diagnosing whether the sensor 40 is in a normal condition or in a fault condition. The diagnosing block 64 corresponds to the blocks 51 to 55.

The block 60 has a newly deposition quantity estimating block 65 for estimating a quantity dPM of the particulate matters newly deposited in the DPF 34 every unit time, a total deposition quantity calculating block 66 for calculating a total quantity of the particulate matters deposited in the DPF 34 until now, a burned quantity estimating block 67 for estimating a quantity of the particulate matters burned in the DPF 34 every unit time, an accumulation quantity determining block 68 for determining a quantity of the particulate matters currently accumulated in the DPF 34 from the total deposition quantity and the burned quantity, and a lower limit guard processing block 69 for setting a lower limit quantity of the particulate matters accumulated in the DPF 34 at zero.

The block 65 estimates a quantity dPM of the particulate matters newly deposited in the DPF 34 every unit time on the basis of operation conditions of the engine 10. More specifically, the ECU 50 calculates a torque required by a driver from the stroke position detected in the sensor 42 and determines a quantity Q of the fuel injected into the engine 10 from the required torque. Further, the ECU 50 determines an engine speed NE from a change of the crank angle detected in the sensor 28. The block 65 calculates the quantity dPM from the injected fuel quantity Q and the engine speed NE. The quantity dPM is increased with the quantity Q and the engine speed NE.

The block 66 sums up the quantities dPM calculated in the block 65 to obtain a total deposition quantity. When the engine system shown in FIG. 1 is operated for the first time, the total deposition quantity is preset at zero.

The block 67 estimates a quantity (or burned quantity) of the particulate matters burned in the DPF 34 every unit time on the basis of operation conditions of the engine 10. More specifically, the burned quantity is increased with a temperature of the DPF 34, so that the block 67 calculates the burned quantity from a temperature Td of the DPF 34 estimated in the block 62.

The block 68 subtracts the burned quantity from the total deposition quantity every unit time to determine a quantity (or accumulated quantity) of the particulate matters currently accumulated in the DPF 34.

The block 69 sets the accumulated quantity determined in the block 68 at zero if the accumulated quantity is negative. Then, the block 69 outputs the accumulated quantity as an estimated PM quantity. Therefore, a lower limit of the estimated PM quantity is set at zero.

The block 61 estimates a pressure Pg of the exhaust gas on the upstream side of the DPF 34 on the basis of operation conditions of the engine 10. More specifically, the engine speed NE and the injected fuel quantity Q specify the state of the exhaust gas. Further, the exhaust gas pressure Pg on the upstream side of the DPF 34 is increased with the estimated PM quantity. Therefore, the block 61 calculates the exhaust gas pressure Pg from the engine speed NE, the injected fuel quantity Q and the estimated PM quantity. For example, the block 61 has a plurality of two-dimensional maps corresponding to a plurality of values of the estimated PM quantity, respectively. Each map indicates a relation among the engine speed NE, the injected fuel quantity Q and the exhaust gas pressure Pg.

The block 62 estimates a temperature Td of the DPF 34 according to a temperature estimating model from the estimated PM quantity, the engine speed NE, the injected fuel quantity Q, a quantity GA of the air taken in the engine 10, a temperature Teu of the exhaust gas detected in the sensor 36 at the upstream side of the DPF 34 and a temperature Ted of the exhaust gas detected in the sensor 38 at the downstream side of the DPF 34. The quantity GA is detected in the meter 14.

More specifically, when the engine 10 is operated in a stationary or stable state, the DPF temperature Td becomes equal to the temperature Ted of the exhaust gas at the downstream side of the DPF 34. In contrast, when the engine 10 is operated in a transient state, the DPF temperature Td differs from the temperature Ted. To estimate the temperature Td even in the transient state of the engine 10, the DPF 34 is partitioned into a plurality of cells along a stream direction of the gas, a temperature of each cell is estimated according to the model, a weighted mean of the estimated temperatures of the cells is set as the temperature Td. A temperature of each cell is estimated from the temperature Teu, temperatures of adjacent cells, a reduction of hydrocarbon in the adjacent upstream cell, an oxygen consumption in the adjacent upstream cell and the estimated PM quantity. The reduction of hydrocarbon and the oxygen consumption are estimated on the basis of operation conditions of the engine 10 such as the taken air quantity QA, the temperature Teu, the engine speed NE, the injected fuel quantity Q and the estimated PM quantity. To estimate the temperature of the most upstream cell, the temperature of the adjacent upstream cell is set at the temperature Teu, and a quantity of hydrocarbon in the adjacent upstream cell is calculated from the engine speed NE and the injected fuel quantity Q. Further, the estimated temperatures of the cells are corrected based on a difference between the temperature Ted and the estimated temperature of the most downstream cell, and the DPE temperature Td is estimated from the corrected temperatures of the cells. For example, the estimation of the DPE temperature Td according to the model is described in Published Japanese Patent First Publication No. 2006-37742.

The estimation of the DPE temperature Td is not limited to this mode. For example, in an alternate model, the temperature Ted detected in the sensor 38 is expressed by a first-order lag and a dead time of the DPE temperature Td. In a model inverse to this alternate model, the DPE temperature Td can be estimated from the temperature Ted. In this inverse model, a time constant and a dead time are changeably set based on a volume flow rate Vex of the exhaust gas. The estimation of the DPE temperature Td according to the inverse model is described in Published Japanese Patent First Publication No. 2004-245109.

The block 63 calculates a mass flow rate of the exhaust gas from a sum of the air quantity GA expressed by weight and the injected fuel quantity Q expressed by weight and determines a volume flow rate Vex of the exhaust gas from the mass flow rate of the exhaust gas, the pressure Pg estimated in the block 61 and the temperature Td estimated in the block 62 according to the equation of state of ideal gas.

The block 64 obtains a first detection signal of the sensor 40 when the judging block 52 judges the engine 10 to be operated in the low flow rate region, and obtains a second detection signal of the sensor 40 when the judging block 52 judges the engine 10 to be operated in the high flow rate region. When no failure occurs in the sensor 40, the first detection signal indicates a low differential pressure of the exhaust gas between the upstream and downstream sides of the DPF 34, and the second detection signal indicates a high differential pressure of the exhaust gas between the upstream and downstream sides of the DPF 34. When a failure has occurred in the sensor 40, the first and second detection signals are set at the same fixed value which has no relation to a differential pressure of the exhaust gas. The block 64 judges or diagnoses a condition of the sensor 40 from a difference between levels of the first and second detection signals. For example, when a difference between levels of the first and second detection signals is smaller than a predetermined value, the block 64 judges the sensor 40 to be in a fault condition.

Figure 9:
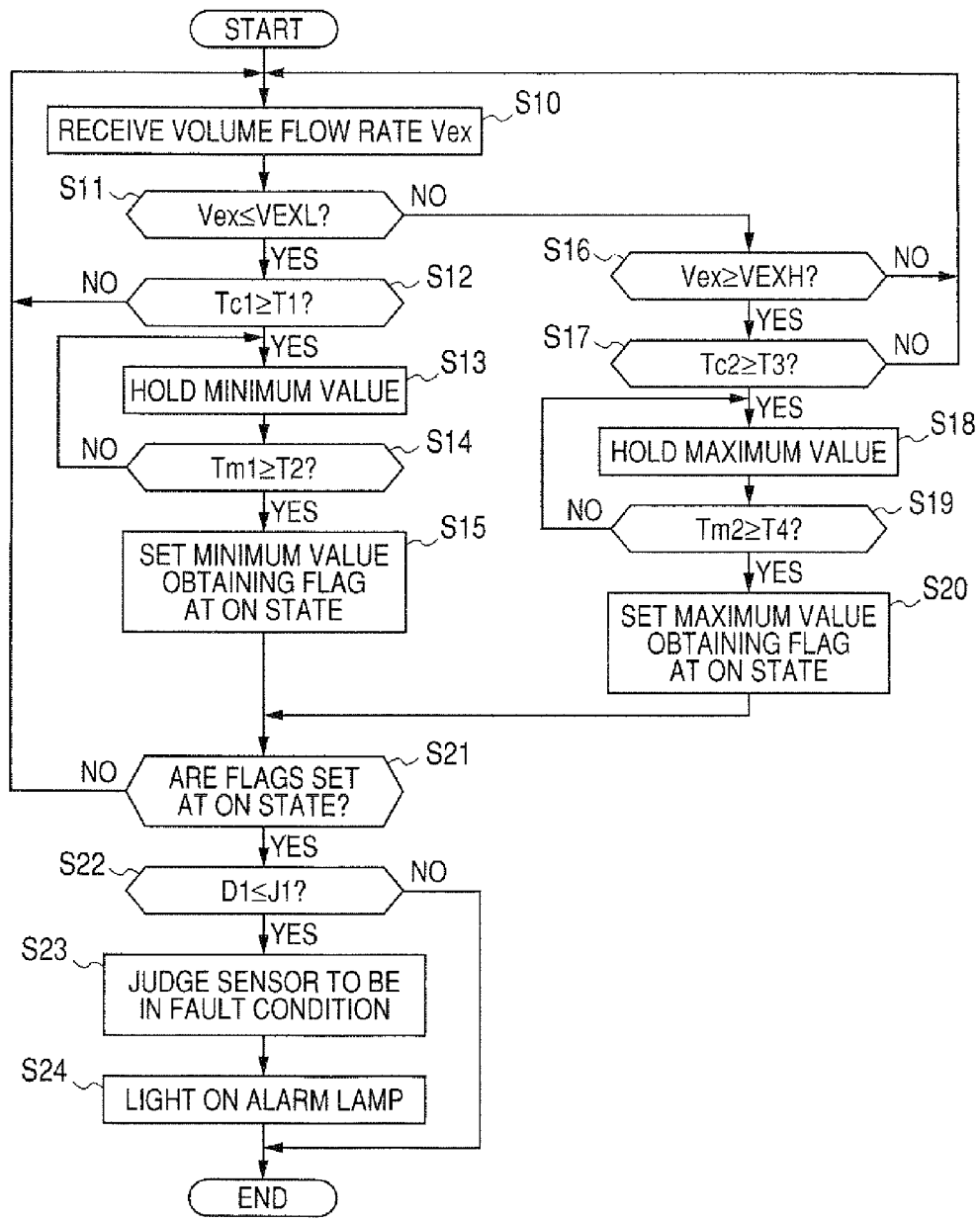
FIG. 9 shows the procedure of an operation of a diagnostic block shown in FIG. 8 according to this embodiment.

A diagnostic operation of the block 64 is described in more detail with reference to FIG. 9. FIG. 9 shows the procedure of a diagnostic operation of the block 64 according to this embodiment. This procedure is repeatedly performed in a predetermined cycle.

As shown in FIG. 9, at step S10, the block 64 or 51 receives a volume flow rate Vex of the exhaust gas from the block 63. At step S11, the block 64 or 51 judges whether or not the volume flow rate Vex is equal to or lower than the low volume flow rate threshold value VEXL. In case of the affirmative judgment, the block 64 judges the engine 10 to be operated in the low flow rate region, and the procedure proceeds to step S12.

At step S12, the block 64 or 54 judges whether or not a continuation time Tc1 of the operation of the engine 10 in the low flow rate region is equal to or more than a first predetermined time T1 or more. This judgment is performed because of the following reason. Just after the operation of the engine 10 in the low flow rate region is started, the engine 10 is set in an unstable state. In this case, a differential pressure of the exhaust gas is largely fluctuated with time even when a flow rate of the exhaust gas is constant. To detect a differential pressure of the exhaust gas in the sensor 40 when the engine 10 is set in a stable state, the first predetermined time T1 is set at a period time required to stably operate the engine 10, and the sensor 40 refrains from detecting a differential pressure until the time T1 passes. In case of the negative judgment at step S12, the procedure returns to step S10.

In contrast, at step S12, when the continuation time Tc1 is equal to or more than the first predetermined time T1, the engine 10 is stably operated, and a differential pressure of the exhaust gas becomes stable. Therefore, the procedure proceeds to step S13. In this case, the sensor 40 receives external noises or a changeable applied voltage. Therefore, even when the sensor 40 produces a detection signal indicating the stable differential pressure, a level of the detection signal is fluctuated within a fluctuation value Pf.

At step S13 and step S14, the block 64 or 52 obtains fluctuated levels of the detection signal during a second predetermined time T2 after the first predetermined time T1 and extracts a minimum value (or first detection result) from the levels. More specifically, at step S13, the block 64 receives a detection signal from the sensor 40 every unit time and holds a minimum value among levels of the received signal. When the block 64 receives a level lower than the minimum value before the second predetermined time T2 passes, the block 64 renews the minimum value to a new minimum value. At step S14, when a minimum value holding time Tm1 is equal to or more than the second predetermined time T2, the procedure proceeds to step S15. At step S15, the block 64 sets a minimum value obtaining flag at an on state, and the procedure proceeds to step S21.

In contrast, in case of the negative judgment at step S31, the procedure proceeds to step S16. At step S16, the block 64 or 51 judges whether or not the volume flow rate Vex is equal to or higher than the high volume flow rate threshold value VEXH. The value VEXH is set to be higher than the value VEXL. In case of the negative judgment, the procedure returns to step S10. That is, when the volume flow rate Vex is placed between the regions, the diagnostic operation is stopped until the volume flow rate Vex is placed in one of the regions. In contrast, in case of the affirmative judgment at step S16, the block 64 judges the engine 10 to be operated in the high flow rate region, and the procedure proceeds to step S17.

At step S17, the block 64 or 55 judges whether or not a continuation time Tc2 of the operation of the engine 10 in the high flow rate region is equal to or more than a third predetermined time T3 or more. The third predetermined time T3 is set at a period of time required to stabilize the operation of the engine 10 in the high flow rate region. In case of the negative judgment at step S17, the procedure returns to step S10.

In contrast, when the continuation time Tc2 is equal to or more than the third predetermined time T3, the procedure proceeds to step S18. At step S18 and step S19, the block 64 or 52 extracts a maximum value (or second detection result) from levels of the detection signal during a fourth predetermined time T4 after passage of the third predetermined time T3. More specifically, the block 64 receives a detection signal from the sensor 40 every unit time, holds a maximum value among levels of the received signal. When the block 64 receives a level higher than the maximum value before the fourth predetermined time T4 passes, the block 64 renews the maximum value to a new maximum value. When a maximum value holding time Tm2 is equal to or more than the fourth predetermined time T4, at step S20, the block 64 sets a maximum value obtaining flag at an on state, and the procedure proceeds to step S21.

At step S21, the block 64 or 53 judges whether or not the minimum and maximum value obtaining flags are set in the on state together. In other words, the block 64 judges whether or not both the minimum and maximum values are obtained from the sensor 40. In case of the negative judgment, the procedure returns to step S10 to hold both the minimum and maximum values in the block 64. In contrast, in case of the affirmative judgment at step S21, the procedure proceeds to step S22.

At step S22, the block 64 or 53 subtracts the minimum value from the maximum value to obtain a subtracted value D1. Then, to judge whether or not a failure has occurred in the sensor 40, the block 64 or 53 judges whether or not the subtracted value D1 is equal to or lower than a failure judging value J1. The failure judging value is set at a low positive value. The failure judging value is set to reliably diagnose an operation condition of the sensor 40. More specifically, when a failure has occurred in the sensor 40, a level of a detection signal output from the sensor 40 is fixed so as to ideally equalize the maximum value with the minimum value. However, external noises are inevitably superimposed into the detection signal of the sensor 40. In this case, even when the detection signal is filtered in a low pass filter, the ECU 50 receives the detection signal set at a fluctuated level every unit time. Further, when a voltage applied to the power source line LV from the ECU 50 is fluctuated, the level of the detection signal is fluctuated. Therefore, even when a failure has occurred in the sensor 40, the level of the detection signal received in the ECU 50 is fluctuated within a fluctuation value Pf, and the subtracted value sometimes differs from zero. In this embodiment, the failure judging value J1 is set at the fluctuation value Pf or more while considering the fluctuation of the level of the detection signal. Therefore, the ECU 50 can reliably judge or diagnose a condition of the sensor 40.

In case of the negative judgment at step S22, the block 64 or 53 judges the sensor 40 to be in a normal condition, and the procedure in this cycle is finished. In contrast, in case of the affirmative judgment at step S22, at step S23, the block 64 or 53 judges the sensor 40 to be put in a fault condition. Then, at step S24, the block 64 sets a fault judgment permission flag at an on state, and the block 64 lights on an alarm lamp such as the display 90 to inform a driver of the occurrence of a failure in the sensor 40. Then, the procedure in this cycle is finished.

Figure 10:
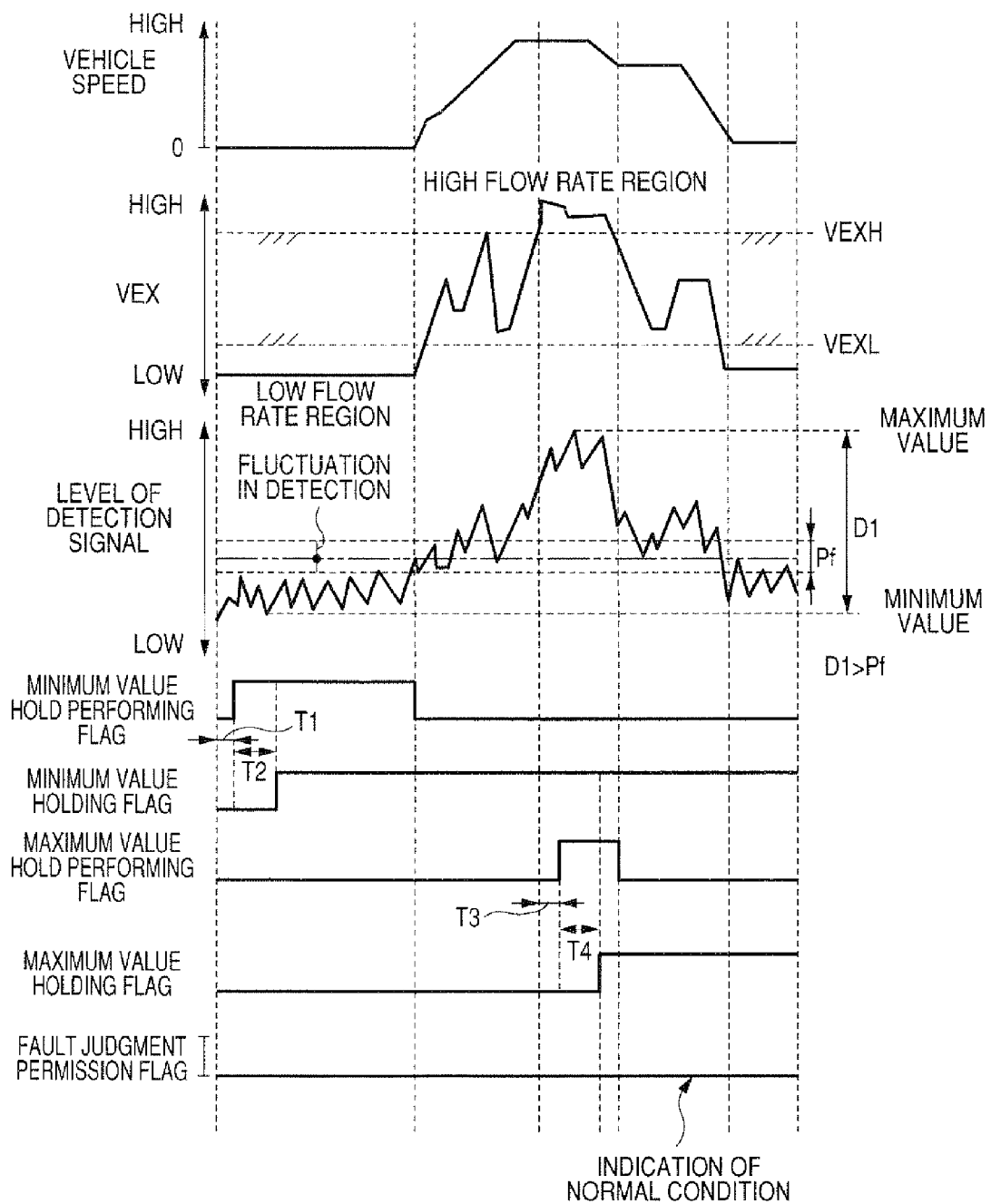
FIG. 10 shows a timing chart of a vehicle speed, a volume flow rate, a signal level and flags in a normal condition of a differential pressure detecting sensor.
Figure 11:
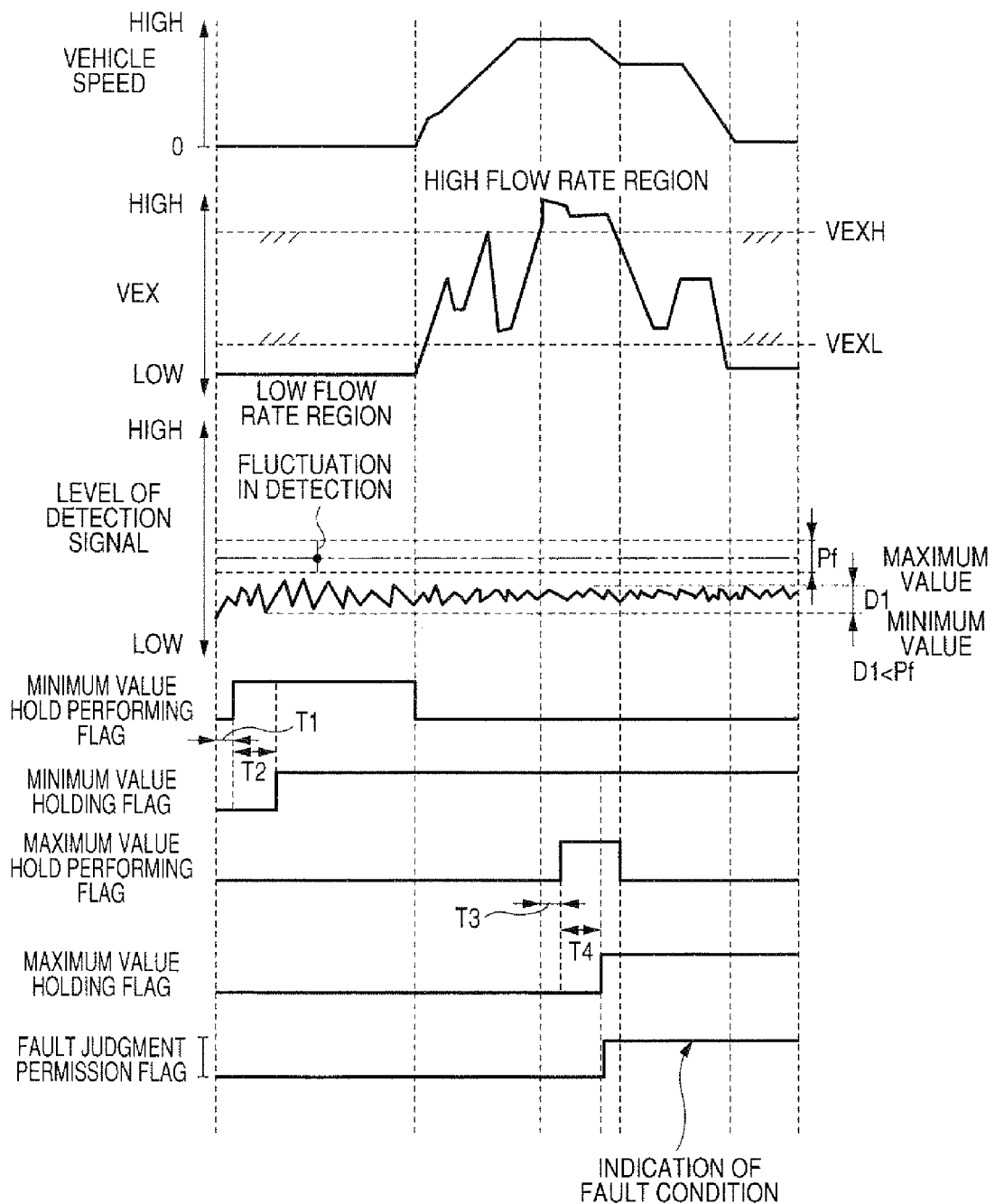
FIG. 11 shows a timing chart of a vehicle speed, a volume flow rate, a signal level and flags in a fault condition of the sensor.

An example of the diagnostic operation performed for the sensor 40 is shown in FIG. 10 and FIG. 11. FIG. 10 shows a timing chart of a vehicle speed, a volume flow rate Vex of the exhaust gas, a level of a detection signal and flags in a normal condition of the sensor 40, while FIG. 11 shows a timing chart of a vehicle speed, a volume flow rate Vex, a level of a detection signal and flags in a fault condition of the sensor 40.

As shown in FIG. 10 and FIG. 11, in a transient process from a low vehicle speed to a high vehicle speed, an operation condition of the engine 10 is changed from the low flow rate region to the high flow rate region. During this transient process, the ECU 50 obtains a minimum value of the detection signal in the low flow rate region and obtains a maximum value of the detection signal in the high flow rate region. When the difference D1 between the maximum and minimum values is higher than the failure judging value Pf (see FIG. 10), the ECU 50 judges the sensor 40 to be in a normal condition. In contrast, when the difference D1 is equal to or lower than the failure judging value Pf (see FIG. 11), the ECU 50 judges the sensor 40 to be put in a fault condition.

To reliably obtain this difference larger than the failure judging value Pf when no failure occurs in the sensor 40, a difference between the high and low flow rate threshold values VEXH and VEXL is set sufficiently large. Therefore, the ECU 50 can reliably judge or diagnose a condition of the sensor 40.

Further, as shown in FIG. 7, a differential pressure DP of the exhaust gas between the upstream and downstream sides of the DPF 34 is increased with the quantity of the particulate matters accumulated in the DPF 34, and the quantity of the accumulated particulate matters is changed with time during an operation of the engine 10. Therefore, when an obtaining time of the maximum value differs largely from an obtaining time of the minimum value, the quantity of accumulated particulate matters at the obtaining time of the maximum value also differs largely from that at the obtaining time of the minimum value. In this case, even when a failure has occurred in the sensor 40, there is a probability that an absolute difference D1 between the maximum and minimum values may become higher than the failure judging value Pf. That is, the ECU 50 cannot reliably diagnose a condition of the sensor 40. To prevent a wrong judgment or diagnosis of the ECU 50, it is preferred that a difference between an obtaining time of the maximum value and an obtaining time of the minimum value be set to be shorter than a predetermined period of time.

Effects obtained in this embodiment are now described.

A differential pressure of the exhaust gas between upstream and down stream sides of the DPF 34 is increased with a flow rate of the exhaust gas. Therefore, when the sensor 40 is in a normal condition, a first level of the detection signal obtained when the engine 10 is operated in the low flow rate region is considerably differentiated from a second level of the detection signal obtained when the engine 10 is operated in the high flow rate region. In contrast, when a failure has occurred in the sensor 40, the sensor 40 is put in a fault condition. Therefore, a level of the detection signal is fixed regardless of a flow rate of the exhaust gas, and the first level is substantially equal to the second level. In this embodiment, the ECU 50 judges or diagnoses from a difference between the first and second levels. Accordingly, the ECU 50 can reliably judge or diagnose whether the sensor 40 is in a normal condition or in a fault condition. For example, when the difference between the first and second levels is small, the ECU 50 can judge the sensor 40 to be in a fault condition.

Further, a level of the detecting signal is fluctuated due to external noises superimposed into the detecting signal by a fluctuation value Pf regardless of a differential pressure of the exhaust gas between upstream and downstream sides of the DPF 34, the exhaust gas has a first differential pressure at most when the engine 10 is operated in the low flow rate region, and the exhaust gas has a second differential pressure at least when the engine 10 is operated in the high flow rate region. The operation condition judging block 52 gives a gap between the low flow rate region and the high flow rate region such that a difference between the first and second differential pressures becomes larger than the fluctuation value Pf. The diagnostic block 53 judges that a failure has occurred in the sensor 40 when the difference between the first and second levels is equal to or smaller than the fluctuation value Pf. Accordingly, the ECU 50 can reliably judge or diagnose against the external noises that the sensor 40 is in a fault condition.

Moreover, the judging block 52 sets the low flow rate region to be equal to or lower than the low flow rate threshold value VEXL and sets the high flow rate region to be equal to or higher than the high flow rate threshold value VEXH which is set higher than the value VEXL. When a flow rate of the exhaust gas passing through the DPF 34 is increased, a fluid resistance to the exhaust gas in the DPF 34 is heightened. Accordingly, the first and second levels of the detection signal can be sufficiently differentiated from each other, so that the ECU 50 can reliably judge or diagnose whether the sensor 40 is in a normal condition or in a fault condition.

Furthermore, the engine 10 is set in an unstable state just after an operation of the engine 10 is started in the low flow rate region. Further, the engine 10 is set in an unstable state just after an operation of the engine 10 is started in the high flow rate region. Therefore, a differential pressure of the exhaust gas fluctuates greatly in each of the regions. At this time, a difference between the differential pressures sometimes becomes small Therefore, when the engine 10 is set in an unstable state, it is difficult to judge or diagnose a condition of the sensor 40. In this embodiment, when the first predetermined time T1 passes after the start of the operation in the low flow rate region, the judging block 54 judges the engine 10 to be put in a stable state, and the obtaining block 52 obtains the first level of the detection signal. Further, when the third predetermined time T3 passes after the start of the operation in the high flow rate region, the judging block 55 judges the engine 10 to be put in a stable state, and the obtaining block 52 obtains the second level of the detection signal. In this case, a difference between differential pressures in the regions becomes reliably high. Accordingly, the ECU 50 can reliably judge or diagnose whether the sensor 40 is in a normal condition or in a fault condition.

Still further, the obtaining block 52 obtains a plurality of first levels of the detection signal during the operation of the engine 10 in the low flow rate region and obtains a plurality of second levels of the detection signal during the operation of the engine 10 in the high flow rate region. When a difference between a minimum value of the first detection results and a maximum value of the second detection results is equal to or smaller than a predetermined value, the diagnostic block 53 judges or diagnoses a condition of the sensor 40. Because the difference between the minimum and maximum values becomes highest among differences obtained from a comparison of the first detection results and the second detection results, the ECU 50 can reliably judge or diagnose whether the sensor 40 is in a normal condition or in a fault condition.

Still further, a level of the detection signal output by the sensor 40 is changeable in a normal range when the sensor 40 is in a normal condition and is fixed within the normal range when the sensor 40 is put in a fault condition Therefore, although levels of the detection signal obtained in the high and low flow rate regions are placed within the normal range regardless of whether the sensor 40 is in a normal condition or in a fault condition, a difference between the levels in a fault condition considerably differs from a difference between the levels in a normal condition. Accordingly, the ECU 50 can reliably judge or diagnose according to the difference between the levels whether the sensor 40 is in a normal condition or in a fault condition.

Still further, the sensor 40 has the sensing portion 70a, the differential amplifier 72 and a conducting line L1, L2, L3 or L4. A disconnection of the conducting line places the sensor 40 in a fault condition. In response to this disconnection, a level of the detection signal is fixed in a normal range wherein a level of the detection signal is changeable when the sensor 40 is in a normal condition. Therefore, although levels of the detection signal obtained in the high and low flow rate regions are placed within the normal range regardless of whether the sensor 40 is in a normal condition or in a fault condition, the ECU 50 can reliably judge or diagnose according to the difference between the levels whether the sensor 40 is in a normal condition or in a fault condition.

In this embodiment, when PV, PM, PP or PG disconnection has occurred in the sensor 40, the ECU 50 judges or diagnoses the sensor 40 to be in a fault condition. In addition, when LG or LV disconnection has occurred in the sensor 40, it is apparent that a difference between the first and second levels of the detection signal becomes substantially equal to each other. Therefore, even when LG or LV disconnection has occurred in the sensor 40, the ECU 50 can reliably judge or diagnose the sensor 40 to be in a fault condition.

FIRST MODIFICATION

In the embodiment, each of the low and high flow rate regions is fixed by fixing the low and high flow rate threshold values VEXL and VEXH. However, as shown in FIG. 7, when a volume flow rate Vex of the exhaust gas is fixed, the differential pressure of the exhaust as is increased with the quantity of the accumulated particulate matters. Therefore, a difference between differential pressures of the exhaust gas at the values VEXL and VEXH is changed with the quantity of the accumulated particulate matters. To reliably judge or diagnose a condition of the sensor 40, a difference between differential pressures of the exhaust gas at the values VEXL and VEXH should be set to be equal to or larger than a predetermined pressure value corresponding to the fluctuation value Pf.

Figure 12:
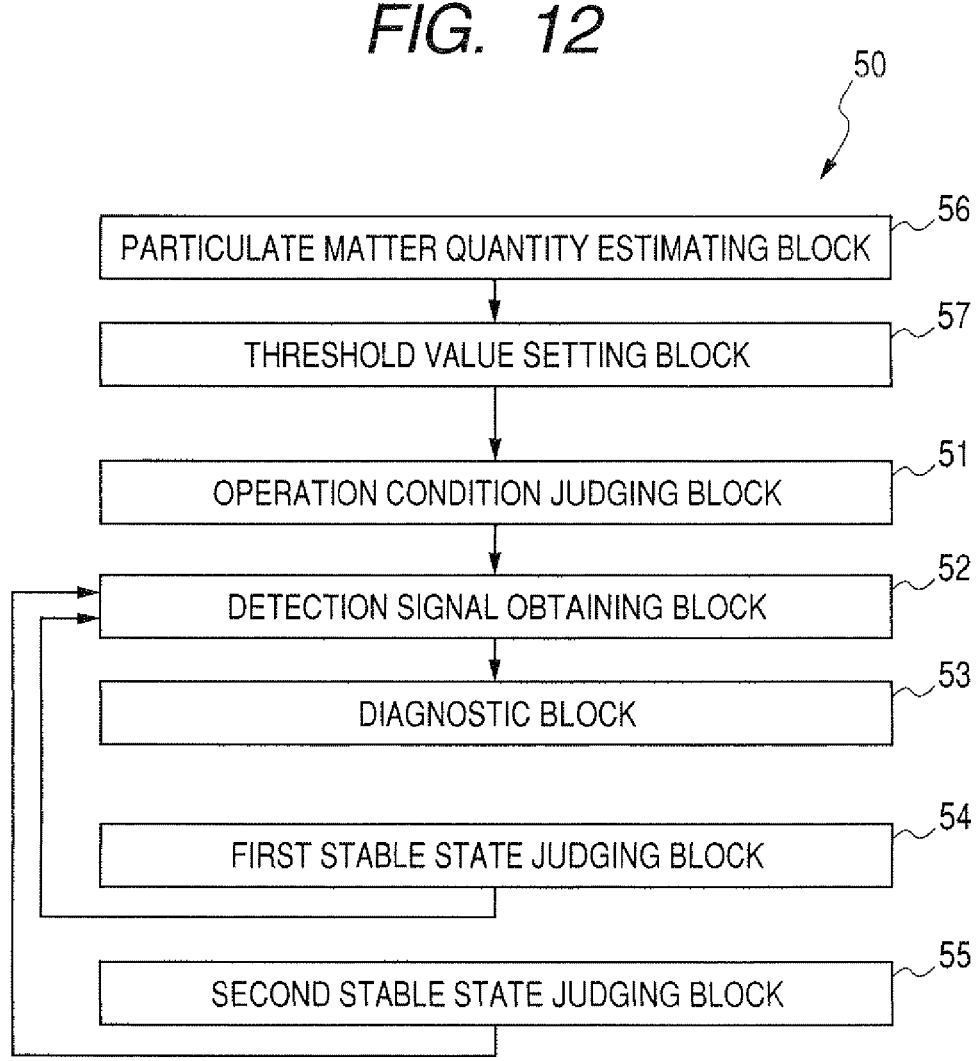
FIG. 12 is a block diagram of the electronic control unit shown in FIG. 1 according to a first modification of the embodiment.

In this modification, as shown in FIG. 12, the ECU 50 further has a particulate matter quantity estimating block 56 and a threshold value setting block 57. When the sensor 40 is in a normal condition, the block 56 estimates a quantity of the accumulated particulate matters from a flow rate of the exhaust gas calculated in the calculating block 63 and a differential pressure DP of the exhaust gas detected by the sensor 40 according to the relation shown in FIG. 7. The block 57 sets the values VEXL and VEXH according to the estimated quantity of the particulate matters such that a difference between differential pressures of the exhaust gas at the values VEXL and VEXH is set at a predetermined pressure value corresponding to the fluctuation value Pf.

Accordingly, the difference between the differential pressures of the exhaust gas can reliably be set to be equal to or larger than the predetermined pressure value.

SECOND MODIFICATION

In the embodiment, the low and high flow rate regions are determined by using the low and high flow rate threshold values VEXL and VEXH. However, the low and high flow rate regions may be determined by using an engine speed NE determined in the ECU 50 from data of the sensor 28. More specifically, the judging block 51 sets a first value and a second value higher than the first value. When the engine speed NE is equal to or lower than the first value, the judging block 51 judges the engine 10 to be operated in the low flow rate region. When the engine speed NE is equal to or higher than the second value, the judging block 51 judges the engine 10 to be operated in the high flow rate region.

Further, the low and high flow rate regions may be determined by using a vehicle speed. A vehicle with the engine system shown in FIG. 1 has a vehicle speed sensor (not shown) for detecting a rotational speed of a transmission (not shown). The ECU 50 converts the rotational speed into a vehicle speed. This vehicle speed sensor is well known. Generally, because a flow rate of the exhaust gas is increased with a vehicle speed, a pressure difference detected in the sensor 40 is increased with the vehicle speed. In this modification, the judging block 51 sets a first value and a second value higher than the first value. When the vehicle speed is equal to or lower than the first value, the judging block 51 judges the engine 10 to be operated in the low flow rate region. When the vehicle speed is equal to or higher than the second value, the judging block 51 judges the engine 10 to be operated in the high flow rate region.

Moreover, the low and high flow rate regions may be determined by using a quantity GA of the air taken into the engine 10. The quantity GA is determined in the ECU 50 from data of the meter 14. Generally, because a flow rate of the exhaust gas derived from the fuel and air is increased with the quantity GA, a pressure difference detected in the sensor 40 is increased with the quantity GA. In this modification, the judging block 51 sets a first value and a second value higher than the first value. When the quantity GA expressed by weight is equal to or lower than the first value, the judging block 51 judges the engine 10 to be operated in the low flow rate region. When the quantity GA expressed by weight is equal to or higher than the second value, the judging block 51 judges the engine 10 to be operated in the high flow rate region.

Furthermore, the low and high flow rate regions may be determined by using a stroke position of the accelerator pedal 43 detected in the sensor 42 or a quantity Q of the fuel injected into the engine 10. The ECU 50 determines the quantity Q from the stroke position. Generally, an engine speed NE is increased with the quantity Q, and a flow rate of the exhaust gas derived from the fuel and air is increased with the quantity Q. Therefore, a pressure difference detected in the sensor 40 is increased with the quantity Q. In this modification, the judging block 51 sets a first value and a second value higher than the first value. When the stroke position or quantity Q is equal to or lower than the first value, the judging block 51 judges the engine 10 to be operated in the low flow rate region. When the stroke position or quantity Q is equal to or higher than the second value, the judging block 51 judges the engine 10 to be operated in the high flow rate region.

In any of the cases in this modification, the first and second values are set such that a difference between a differential pressure of the exhaust gas in the low flow rate region and a differential pressure of the exhaust gas in the high flow rate region is equal to or larger than a predetermined pressure value corresponding to the fluctuation value Pf.

THIRD MODIFICATION

In the embodiment, the block 64 or 53 of the ECU 50 judges or diagnoses directly from a difference between levels of the detection signal in the low and high flow rate regions whether the sensor 40 is in a normal condition or in a fault condition. However, as shown in FIG. 7, a quantity of the accumulated particulate matters can be estimated from a level of the detection signal and a volume flow rate Vex of the exhaust gas calculated in the calculating block 63. A quantity of the accumulated particulate matters is considerably changed with the volume flow rate Vex. With reference to FIG. 7, when the sensor 40 is in a normal condition, a first quantity of the accumulated particulate matters estimated from a first level of the detection signal and a first volume flow rate Vex of the exhaust gas in the low flow rate region is substantially equal to a second quantity of the accumulated particulate matters estimated from a second level of the detection signal and a second volume flow rate Vex of the exhaust gas in the high flow rate region. In contrast, when the sensor 40 is in a fault condition, the first level of the detection signal substantially becomes equal to the second level of the detection signal. Therefore, the first quantity of the accumulated particulate matters is considerably differentiated from the second quantity of the accumulated particulate matters. Accordingly, to judge or diagnose indirectly from a difference between levels of the detection signal whether the sensor 40 is in a normal condition or in a fault condition, the calculating block 63 calculates a low flow rate of the exhaust gas in the low flow rate region and calculates a high flow rate of the exhaust gas in the high flow rate region, and the estimating block 56 estimates a first quantity of the accumulated particulate matters from the low flow rate of the exhaust gas and a detection signal of the sensor 40 corresponding to the low flow rate and estimates a second quantity of the accumulated particulate matters from the high flow rate of the exhaust gas and a detection signal of the sensor 40 corresponding to the high flow rate. The diagnosing block 64 judges from a difference between the first and second quantities of the accumulated particulate matters whether the sensor 40 is in a normal condition or in a fault condition.

FOURTH MODIFICATION

The quantity of the accumulated particulate matters estimated in the block 56 depends on the detection signal of the sensor 40, while the estimated PM quantity estimated in the block 60 is determined independently of the detection signal. Therefore, when the sensor 40 is in a fault condition, the quantities estimated in the blocks 56 and 60 are sometimes largely differentiated from each other. More specifically, when the sensor 40 is in a normal condition, a first difference D3 between the quantities estimated in the blocks 56 and 60 in case of the low flow rate region is substantially equal to zero, and a second difference D2 between the quantities estimated in the blocks 56 and 60 in case of the high flow rate region is substantially equal to zero. In contrast, when the detection signal is fixed to the LO clamp value or a value near the LO clamp value due to the occurrence of a failure in the sensor 40, the first difference D1 becomes small, but the second difference D2 becomes large (D1 ≪ D2). In contrast, when the detection signal is fixed to the HI clamp value or a value near the HI clamp value due to the occurrence of a failure in the sensor 40, the first difference D1 becomes large, but the second difference D2 becomes small (D1 ≫ D2).

Therefore, in this modification, when one of the first and second differences becomes small and the other one becomes large, the diagnosing block 64 judges the sensor 40 to be in a fault condition.

OTHER MODIFICATIONS

In the block 60 shown in FIG. 8, a quantity of the accumulated particulate matters is estimated from records of the operation of the engine 10. However, this embodiment should not be construed as limiting the present invention to the structure of the embodiment. For example, as described in Published Japanese Patent First Publication No. 2006-2672, a quantity dPM of newly-deposited particulate matters may be calculated from an air-fuel ratio detected in an air-fuel sensor and the engine speed NE every unit time. A total quantity of particulate matters deposited in the DPF 34 is calculated by summing up the quantities dPM. Further, as described in Published Japanese Patent First Publication No. 2005-307880, a quantity of the accumulated particulate matters may be calculated based on operation conditions of the engine 10, or a quantity of the particulate matters burned in the DPF 34 may be calculated every unit time.

In place of the estimation of the pressure Pg at the upstream side of the DPF 34 in the block 61, the pressure Pg may be detected directly in a pressure sensor disposed in the exhaust pipe 32.

In place of the meter 14 used to estimate the volume flow rate Vex of the exhaust gas, a mass flow rate of the exhaust gas may be detected in a sensor disposed in the exhaust pipe 32 to calculate the volume flow rate Vex from the mass flow rate.

In this embodiment, the ECU 50 judges each of the low and high flow rate regions to be stable when a predetermined time passes after an operation condition of the engine 10 is shifted to the region. However, when a change in the volume flow rate Vex in each region becomes smaller than a predetermined value, the ECU 50 may judge the region to be stable. Generally, the ECU 50 may judge based on a parameter correlating with the stability of a differential pressure of the exhaust gas between the upstream and downstream sides of the DPF 3 whether or not each region is stable.

Further, in this embodiment, the minimum and maximum values of the detection signal in the low and high flow rate regions are detected from the sensor 40 when the operation of the engine 10 is stable, and the ECU 50 judges from the minimum and maximum values whether or not the sensor 40 is in a fault condition. However, the threshold values VEHL and VEXH are set such that a difference between arbitrary values of the detection signal in the low and high flow rate regions becomes sufficiently large enough to judge whether or not the sensor 40 is in a fault condition. Therefore, arbitrary values may be detected in the regions when the operation of the engine 10 is unstable.

What is claimed is:

1. A diagnostic device for diagnosing a condition of a detecting unit which detects, in a normal condition, a differential pressure of an exhaust gas between upstream and downstream sides of an exhaust emission control device disposed in an exhaust system of an internal combustion engine and detects no differential pressure of the exhaust gas in a fault condition, comprising: at least one programmed processor in communication with associated memory, input and output ports and configured to include:

an operation condition judging unit that judges whether the engine is operated in a low flow rate region or in a high flow rate region, a flow rate of the exhaust gas passing through the exhaust emission control device in the high flow rate region being higher than that in the low flow rate region;

a detection result obtaining unit that obtains a first detection result of the detecting unit when the operation condition judging unit judges the engine to be operated in the low flow rate region and obtains a second detection result of the detecting unit when the operation condition judging unit judges the engine to be operated in the high flow rate region; and a diagnostic unit that judges from a difference between the first and second detection results obtained by the detection result obtaining unit whether the detecting unit is in the normal condition or in the fault condition, wherein the detection result obtaining unit is adapted to obtain a plurality of first detection results during the operation of the engine in the low flow rate region and to obtain a plurality of second detection results during the operation of the engine in the high flow rate region, and the diagnostic unit is adapted to judge that the detecting unit is in the fault condition when a difference between a minimum value of the first detection results and a maximum value of the second detection results is equal to or smaller than a predetermined value.

2. The diagnostic device according to claim 1, wherein the detection result of the detecting unit is fluctuated by a fluctuation value regardless of the differential pressure of the exhaust gas, the exhaust gas has a first differential pressure at most when the engine is operated in the low flow rate region, the exhaust gas has a second differential pressure at least when the engine is operated in the high flow rate region, the operation condition judging unit is adapted to give a gap between the low flow rate region and the high flow rate region such that a difference between the first and second differential pressures becomes larger than the fluctuation value, and the diagnostic unit is adapted to judge that the detecting unit is in the fault condition when the difference between the first and second detection results is equal to or smaller than the fluctuation value.

3. The diagnostic device according to claim 1, further comprising a flow rate estimating unit that estimates a flow rate of the exhaust gas from a quantity of air taken into the engine and a quantity of fuel taken into the engine, wherein the operation condition judging unit is adapted to set a first threshold value and a second threshold value set higher than the first threshold value, to judge that the engine is operated in the low flow rate region when the flow rate of the exhaust gas estimated by the flow rate estimating unit is equal to or lower than the first threshold value and to judge that the engine is operated in the high flow rate region when the flow rate of the exhaust gas is equal to or higher than the second threshold value.

4. The diagnostic device according to claim 3, further comprising:

a particulate matter quantity estimating unit that estimates a quantity of particulate matters accumulated in the exhaust emission control device from the flow rate of the exhaust gas estimated by the flow rate estimating unit and a differential pressure of the exhaust gas detected by the detecting unit when the detecting unit is in a normal condition, a threshold value setting unit that sets the first threshold value and the second threshold value according to the quantity of the particulate matters estimated by the particulate matter quantity estimating unit such that a difference between differential pressures of the exhaust gas at the first and second threshold values is set at a predetermined value.

5. The diagnostic device according to claim 1, further comprising:

a first stable state judging unit that judges whether or not the engine operated in the low flow rate region is in a stable state; and a second stable state judging unit that judges whether or not the engine operated in the high flow rate region is in a stable state, wherein the detection result obtaining unit obtains the first detection result when the first stable state judging unit judges that the engine operated in the low flow rate region is in the stable state, and obtains the second detection result when the second stable state judging unit judges that the engine operated in the high flow rate region is in the stable state.

6. The diagnostic device according to claim 1, wherein a level of each of the detection results is changeable in a normal range when the detecting unit is in the normal condition and is fixed within the normal range when the detecting unit is in the fault condition.

7. The diagnostic device according to claim 1, wherein the detecting unit comprises:

a sensing portion for producing a detection signal set at a level corresponding to the differential pressure of the exhaust emission control device;

a differential amplifier for amplifying the detection signal to produce each of the detection results set at an amplified level when the detecting unit is in the normal condition; and a conducting line connecting the sensing portion and the differential amplifier, a disconnection of the conducting line placing the detecting unit in the fault condition.

8. The diagnostic device according to claim 1, wherein the operation condition judging unit detects an engine speed of the internal combustion engine and sets each of the low and high flow rate regions on the basis of the engine speed.

9. The diagnostic device according to claim 1, wherein the operation condition judging unit detects a speed of a vehicle on which the internal combustion engine is mounted, and sets each of the low and high flow rate regions on the basis of the vehicle speed.

10. The diagnostic device according to claim 1, wherein the operation condition judging unit detects a quantity of air taken into the internal combustion engine and sets each of the low and high flow rate regions on the basis of the air quantity.

11. The diagnostic device according to claim 1, wherein the operation condition judging unit detects a stroke position of an accelerator pedal and sets each of the low and high flow rate regions on the basis of the stroke position.

12. The diagnostic device according to claim 1, wherein the operation condition judging unit detects a quantity of fuel injected into the internal combustion engine and sets each of the low and high flow rate regions on the basis of the fuel quantity.

13. The diagnostic device according to claim 1, further comprising a flow rate estimating unit that estimates a low flow rate of the exhaust gas from a quantity of air supplied to the engine and a quantity of fuel supplied to the engine when the operation condition judging unit judges the engine to be operated in the low flow rate region and estimates a high flow rate of the exhaust gas from a quantity of the air and a quantity of the fuel when the operation condition judging unit judges the engine to be operated in the high flow rate region; and a particulate matter quantity estimating unit that estimates a first quantity of particulate matters accumulated in the exhaust emission control device from the low flow rate of the exhaust gas estimated by the flow rate estimating unit and the first detection result of the detecting unit and estimates a second quantity of particulate matters accumulated in the exhaust emission control device from the high flow rate of the exhaust gas and the second detection result of the detecting unit, wherein the diagnostic unit is adapted to judge from a difference between the first and second quantities of the accumulated particulate matters whether the detecting unit is in the normal condition or in the fault condition.

14. The diagnostic device according to claim 1, further comprising a flow rate estimating unit that estimates a low flow rate of the exhaust gas from a quantity of air taken into the engine and a quantity of fuel taken into the engine when the operation condition judging unit judges the engine to be operated in the low flow rate region and estimates a high flow rate of the exhaust gas from a quantity of the air and a quantity of the fuel when the operation condition judging unit judges the engine to be operated in the high flow rate region;

a first particulate matter quantity estimating unit that estimates a first quantity of particulate matters accumulated in the exhaust emission control device from the low flow rate of the exhaust gas estimated by the flow rate estimating unit and the first detection result of the detecting unit and estimates a second quantity of particulate matters accumulated in the exhaust emission control device from the high flow rate of the exhaust gas and the second detection result of the detecting unit;

an accumulated quantity estimating unit that estimates a total quantity of the particulate matters accumulated in the exhaust emission control device from a quantity of fuel supplied to the engine and an engine speed of the engine;

a burned quantity estimating unit that estimates a quantity of the particulate matters burned in the exhaust emission control device from temperatures of the exhaust gas at the upstream and downstream sides of the exhaust emission control device, the quantity of the fuel, the engine speed and a quantity of air supplied to the engine; and a second particulate matter quantity estimating unit that estimates a third quantity of the particulate matters accumulated in the exhaust emission control device from the total quantity of the particulate matters estimated by the accumulated quantity estimating unit and the burned quantity of the particulate matters estimated by the burned quantity estimating unit, when the operation condition judging unit judges the engine to be operated in the low flow rate region, and estimates a fourth quantity of the particulate matters accumulated in the exhaust emission control device from the total quantity of the particulate matters and the burned quantity of the particulate matters when the operation condition judging unit judges the engine to be operated in the high flow rate region, wherein the diagnostic unit is adapted to calculate a first difference between the first and third quantities of the particulate matters estimated by the first and second particulate matter quantity estimating units, to calculate a second difference between the second and fourth quantities of the particulate matters estimated by the first and second particulate matter quantity estimating units, and to judge from a difference between the first and second differences whether the detecting unit is in the normal condition or in the fault condition.

15. A diagnostic device for diagnosing a condition of a detecting unit which detects, in a normal condition, a differential pressure of an exhaust gas between upstream and downstream sides of an exhaust emission control device disposed in an exhaust system of an internal combustion engine and detects no differential pressure of the exhaust gas in a fault condition, comprising: at least one programmed processor in communication with associated memory, input and output ports and configured to include:

an operation condition judging unit that judges whether the engine is operated in a low flow rate region or in a high flow rate region, a flow rate of the exhaust gas passing through the exhaust emission control device in the high flow rate region being higher than that in the low flow rate region;

a detection result obtaining unit that obtains a first detection result of the detecting unit when the operation condition judging unit judges the engine to be operated in the low flow rate region and obtains a second detection result of the detecting unit when the operation condition judging unit judges the engine to be operated in the high flow rate region;

a diagnostic unit that judges from a difference between the first and second detection results obtained by the detection result obtaining unit whether the detecting unit is in the normal condition or in the fault condition;

a flow rate estimating unit that estimates a low flow rate of the exhaust gas from a quantity of air supplied to the engine and a quantity of fuel supplied to the engine when the operation condition judging unit judges the engine to be operated in the low flow rate region and estimates a high flow rate of the exhaust gas from a quantity of the air and a quantity of the fuel when the operation condition judging unit judges the engine to be operated in the high flow rate region;

a particulate matter quantity estimating unit that estimates a first quantity of particulate matters accumulated in the exhaust emission control device from the low flow rate of the exhaust gas estimated by the flow rate estimating unit and the first detection result of the detecting unit and estimates a second quantity of particulate matters accumulated in the exhaust emission control device from the high flow rate of the exhaust gas and the second detection result of the detecting unit, wherein the diagnostic unit is adapted to judge from a difference between the first and second quantities of the accumulated particulate matters whether the detecting unit is in the normal condition or in the fault condition.

16. A diagnostic device for diagnosing a condition of a detecting unit which detects, in a normal condition, a differential pressure of an exhaust gas between upstream and downstream sides of an exhaust emission control device disposed in an exhaust system of an internal combustion engine and detects no differential pressure of the exhaust gas in a fault condition, comprising: at least one programmed processor in communication with associated memory, input and output ports and configured to include:
- an operation condition judging unit that judges whether the engine is operated in a low flow rate region or in a high flow rate region, a flow rate of the exhaust gas passing through the exhaust emission control device in the high flow rate region being higher than that in the low flow rate region;
  - a detection result obtaining unit that obtains a first detection result of the detecting unit when the operation condition judging unit judges the engine to be operated in the low flow rate region and obtains a second detection result of the detecting unit when the operation condition judging unit judges the engine to be operated in the high flow rate region;
- a diagnostic unit that judges from a difference between the first and second detection results obtained by the detection result obtaining unit whether the detecting unit is in the normal condition or in the fault condition;
- a flow rate estimating unit that estimates a low flow rate of the exhaust gas from a quantity of air taken into the engine and a quantity of fuel taken into the engine when the operation condition judging unit judges the engine to be operated in the low flow rate region and estimates a high flow rate of the exhaust gas from a quantity of the air and a quantity of the fuel when the operation condition judging unit judges the engine to be operated in the high flow rate region;
- a first particulate matter quantity estimating unit that estimates a first quantity of particulate matters accumulated in the exhaust emission control device from the low flow rate of the exhaust gas estimated by the flow rate estimating unit and the first detection result of the detecting unit and estimates a second quantity of particulate matters accumulated in the exhaust emission control device from the high flow rate of the exhaust gas and the second detection result of the detecting unit;
- an accumulated quantity estimating unit that estimates a total quantity of the particulate matters accumulated in the exhaust emission control device from a quantity of fuel supplied to the engine and an engine speed of the engine;
- a burned quantity estimating unit that estimates a quantity of the particulate matters burned in the exhaust emission control device from temperatures of the exhaust gas at the upstream and downstream sides of the exhaust emission control device, the quantity of the fuel, the engine speed and a quantity of air supplied to the engine; and
- a second particulate matter quantity estimating unit that estimates a third quantity of the particulate matters accumulated in the exhaust emission control device from the total quantity of the particulate matters estimated by the accumulated quantity estimating unit and the burned quantity of the particulate matters estimated by the burned quantity estimating unit, when the operation condition judging unit judges the engine to be operated in the low flow rate region, and estimates a fourth quantity of the particulate matters accumulated in the exhaust emission control device from the total quantity of the particulate matters and the burned quantity of the particulate matters when the operation condition judging unit judges the engine to be operated in the high flow rate region,
- wherein the diagnostic unit is adapted to calculate a first difference between the first and third quantities of the particulate matters estimated by the first and second particulate matter quantity estimating units, to calculate a second difference between the second and fourth quantities of the particulate matters estimated by the first and second particulate matter quantity estimating units, and to judge from a difference between the first and second differences whether the detecting unit is in the normal condition or in the fault condition.

* * * * *